United States Patent [19]
Johler

[11] Patent Number: 5,557,174
[45] Date of Patent: Sep. 17, 1996

[54] ELECTRONIC BALLAST WITH DIMMER AND HARMONICS FILTER FOR SUPPLYING A LOAD, FOR EXAMPLE A LAMP

[75] Inventor: Günter Johler, Bregenz, Austria

[73] Assignee: Tridonic Bauelemente GmbH, Dornbirn, Austria

[21] Appl. No.: 285,091

[22] Filed: Aug. 3, 1994

[30] Foreign Application Priority Data

Aug. 25, 1993 [DE] Germany .......................... 43 28 608.9
Nov. 29, 1993 [DE] Germany .......................... 43 40 604.1

[51] Int. Cl.$^6$ .................................................. H05B 37/02
[52] U.S. Cl. ..................... 315/194; 315/DIG. 4; 315/224; 315/307; 315/205
[58] Field of Search .......................... 315/307, DIG. 4, 315/194, 224, 209 R, 205

[56] References Cited

U.S. PATENT DOCUMENTS

| | | | |
|---|---|---|---|
| 3,890,537 | 6/1975 | Park et al. | 315/208 |
| 4,523,128 | 6/1985 | Stamm et al. | 315/291 |
| 4,604,552 | 8/1986 | Alley et al. | 315/176 |
| 4,914,355 | 4/1990 | Mertens et al. | 315/225 |
| 5,049,790 | 9/1991 | Herfurth et al. | 315/291 |
| 5,066,894 | 11/1991 | Klier | 315/224 |

FOREIGN PATENT DOCUMENTS 87114018 9/1987 European Pat. Off. .

OTHER PUBLICATIONS

C. H. Sturm and E. Klein, "Betriebsgeräte und Schaltungen für elektrische Lampen", pp. 127–128, 6th Edition, 1992 Siemens AG.

U. Tietze and Ch. Schenk, "Halbleiter–Schaltungstechnik", pp. 563–570 Springer 9th Edition.

Klaus Beut, "Bauelemente der Elektronik, Electronik 2", p. 242, Vogel Verlag, 1975.

Primary Examiner—Robert Pascal
Assistant Examiner—Arnold Kinkead
Attorney, Agent, or Firm—Fitzpatrick, Cella, Harper & Scinto

[57] ABSTRACT

An electronic ballast (2) which includes an electronic harmonics filter (7), the brightness of a lamp (38) can be determined by employment of a dimmer (1) provided in the mains feed, in that a desired value signal (UM) for setting the frequency (f) of the switch (S) is supplied to the controller (8), which desired value signal depends upon the input or output voltage of a rectifier (4) connected downstream of the dimmer (1), in particular dependent upon the curve form of this voltage.

5 Claims, 2 Drawing Sheets

ELECTRONIC BALLAST WITH DIMMER AND HARMONICS FILTER FOR SUPPLYING A LOAD, FOR EXAMPLE A LAMP

BACKGROUND OF THE INVENTION

1. Field of the Invention

The invention relates to an electronic ballast for supplying a load, for example a lamp, in particular a gas discharge lamp, with an a.c. voltage the frequency of which is higher than the mains frequency, having a rectifier for connection to the a.c. mains, an inverter downstream of the rectifier, which inverter generates the higher frequency a.c. voltage for the load, and a harmonics filter arranged between the rectifier and the inverter, the output voltage of which harmonics filter is controlled.

2. Description of the Related Art

When operated at mains frequency, electronic gas discharge lamps have an unsatisfactory light yield and tend to flicker. For this reason, they are usually operated with electronic ballasts which work with mains voltage and generate therefrom a higher frequency operating voltage for the gas discharge lamps, the frequency of which lies in the region from 20 to 50 kHz. The electronic ballasts comprise a rectifier which rectifies the mains voltage, and an inverter which generates the higher frequency operating voltage from the rectified mains voltage. The light yield of gas discharge lamps can be appreciably increased, and flickering can be avoided, by the use of electronic ballasts but at the same time a problem appears in that as a result of the switching processes in the rectifier there occur harmonics which cause unacceptable disturbances when fed back into the mains. To avoid this, a passive filter can be connected between the rectifier and the mains, but this filter must comprise a relatively large and expensive choke. This choke can be avoided if, in place of the passive filter, an electronic harmonics filter is employed, connected between the rectifier and the inverter. The electronic harmonics filter manifests itself in that it removes pulse-like current from the rectifier, whereby the envelope curve of the current pulses is approximated to the sinusoidal half-wave form of the mains frequency.

One such harmonics filter is described, for example, in EP 268 043 A1 or in the book by C. H. Sturm/E. Klein "Betriebsgeräte und Schaltungen für Lampen", Verlag SIEMENS AG, 6. Auflage, 1992 ("Operating devices and circuits for lamps", published by SIEMENS AG, 6th edition, 1992) pages 127/128. The electronic harmonics filter comprises a clocked switching controller which may be, for example, an step-up transformer (booster) or an inverting transformer. The principle of such a clocked switching controller is described in the book by U. Tietze, Ch. Schenk "Halbleiter-Schaltungstechnik" Springer Verlag, 9. Auflage ("Semiconductor circuitry techniques", published by Springer, 9th edition) pages 563 to 570.

With known harmonics filters the output voltage of the switching controller is constantly monitored and compared with a fixed desired-value voltage. For the switch of the switching controller, the controller generates from the control difference a control signal of variable switching frequency. By varying the switching frequency, the output voltage is held constant.

In particular for gas discharge lamps there is additionally the need to alter the operating voltage for the purpose of setting the brightness. Normally this is achieved for lamps by connecting a dimmer in the mains feed. The dimmer can, for example, comprise a phase angle control circuit such as is described in the book by C. A. Sturm/E. Klein on page 141 and in the book by Klaus Beut "Bauelemente der Elektronik, Elektronik 2", Vogel Verlag, 1975 ("Electronic Components, Electronics 2") page 242. The dimmer generates from the mains a.c. voltage pulses of alternating polarity with variable width. By means of a subsequent rectification a d.c. voltage can be generated from these pulses the level of which d.c. voltage is alterable by altering the degree of dimming (phase angle control). In this way, the voltage supplied to the inverter is varied when an electronic ballast without harmonics filter is employed, with the consequence that the operating voltage for the lamp, and thus the brightness of the lamp, is also altered.

The situation is different when the ballast includes an electronic harmonics filter. The latter has, as indicated above, the tendency to maintain the output voltage constant. This means, that, for example, a dimming of the lamp is not possible with the use of a simple dimmer inserted in the mains feed.

SUMMARY OF THE INVENTION

The object of the invention is so to modify an electronic ballast of the kind described in the introduction that the operating voltage generated by the ballast for supplying the load can be varied.

The object is achieved, in accordance with the invention, in that the desired value for the control of the output voltage of the harmonics filter is made dependent upon voltage changes of the input or output voltage of a second rectifier which is likewise to be connected to the a.c. mains.

As is known per se, a first and a second desired value signal are supplied to the controller of an electronic harmonics filter. The first desired value signal corresponds to the unsmoothed half sinusoidal form output voltage of the rectifier and is compared with a first actual value signal which corresponds to the output current of the harmonics filter. The control difference is employed to ensure that the current pulses taken from the rectifier form an envelope curve which correspond to the half sinusoidal form of the mains frequency.

Whilst the second desired value signal has previously been a constant reference voltage, it is now to be derived, in accordance with an expedient embodiment of the invention, in that the output voltage of the second rectifier is compared with a fixed threshold voltage in a comparator and the output signal of the comparator is smoothed in a mean value generator. The output voltage of the mean value generator, employed as second desired value signal, is dependent upon the curve form of the unsmoothed output pulses of the second rectifier. The curve form is alterable by adjustment of a dimmer connected upstream of the second rectifier. The second desired value signal is compared in the controller with a second actual desired value signal corresponding to the output voltage of the electronic harmonics filter. The control difference serves for variation of the switching frequency of the switch of the electronic harmonics filter in such a manner that the output voltage of the electronic harmonics filter is alterable in dependence upon the second desired value signal and thus in dependence upon the degree of dimming of the dimmer.

BRIEF DESCRIPTION OF THE DRAWINGS

An exemplary embodiment of the invention will be described below with reference to the drawings, which show.

DESCRIPTION OF THE PREFERRED EMBODIMENTS

Figure 1:
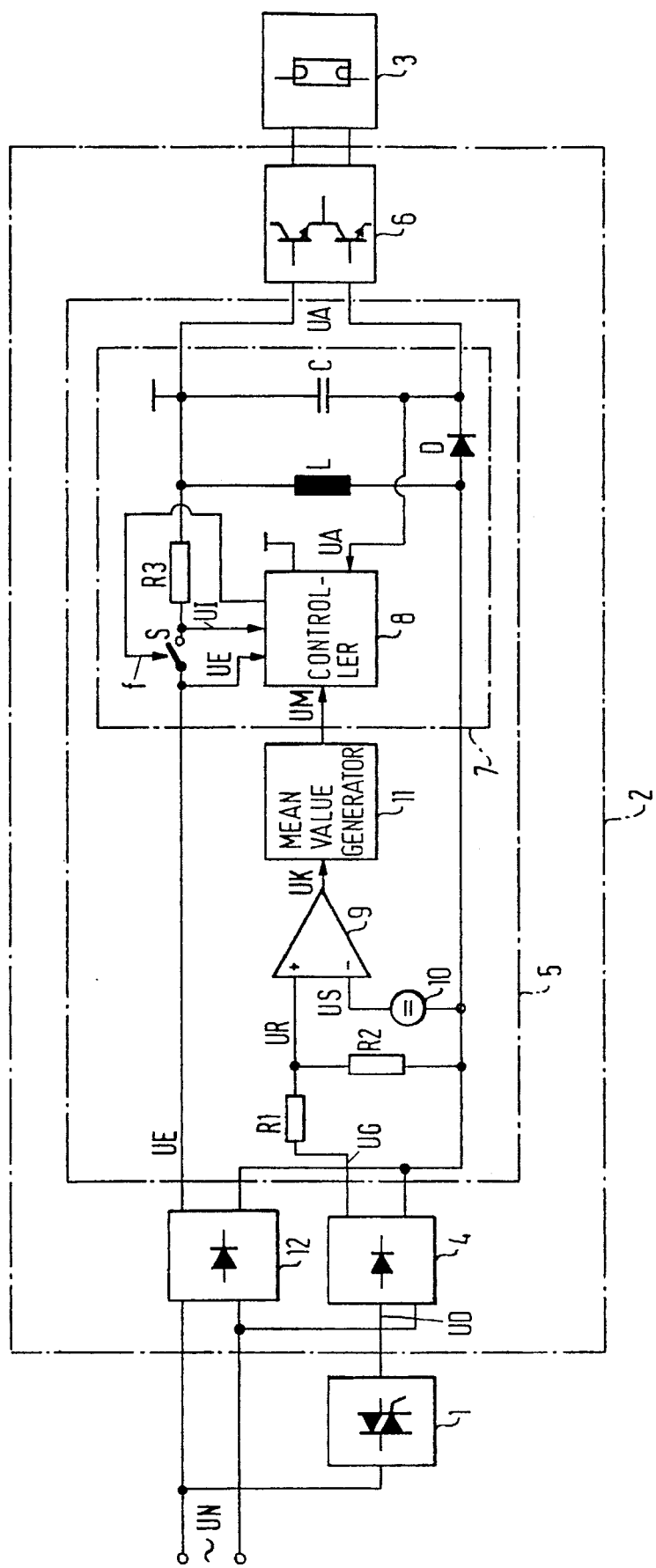
FIG. 1 a block circuit diagram of the electronic ballast with dimmer and lamp.
Figure 2A:
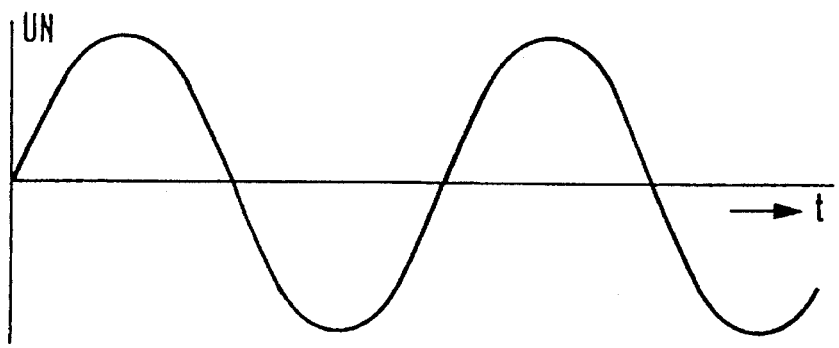
FIG. 2 the temporal development of certain voltages in the block circuit diagram of FIG. 1.

FIG. 1 shows an electronic ballast 2, which serves for operating a gas discharge lamp 3. The ballast 2 is connected to the mains a.c. voltage UN via a first rectifier 12. The mains a.c. voltage is illustrated in FIG. 2a. Parallel to the first rectifier 12, a second rectifier 4 is connected to the mains a.c. voltage via a dimmer 1.

The output voltage of the dimmer UD is illustrated in

Figure 2B:
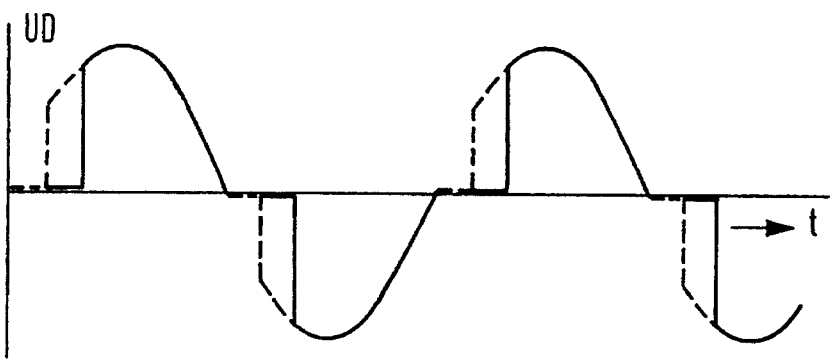
Figure 2C:
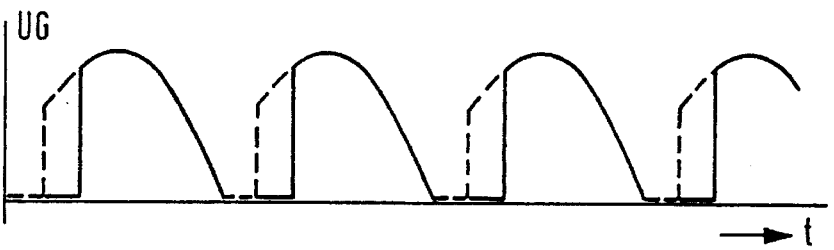

FIG. 2b. This Figure illustrates two degrees of dimming. The lesser degree of dimming is represented by broken lines, whilst the greater degree of dimming is represented by solid lines.

The rectifiers 4 and 12 are preferably bridge rectifiers. The output voltage UG of the bridge rectifier 4 is illustrated in 2c. Here also, the two degrees of dimming can be seen.

An electronic harmonics filter 5 is connected to the first rectifier 12. This generates an output d.c. voltage UA which is supplied to an inverter 6. The inverter generates an a.c. voltage of higher frequency, which lies in the region between 20 and 50 kHz. This higher frequency a.c. voltage is employed for operating the gas discharge lamp 3.

The electronic harmonics filter 5 includes a normal secondarily connected inverting flyback converter 7 to which the rectified unsmoothed output voltage UE of the rectifier 12 is supplied. In one branch, the flyback converter contains a switch S clocked with the frequency f. The clock frequency f is determined by a controller Further, the flyback converter has a choke L, a capacitor C and a diode D. The circuit functions in known manner such that when the switch S is closed current flows through the choke L which thus accumulates energy. When the switch S is opened current flows from the choke L via the diode D to the capacitor C so that the capacitor is charged or further charged. The voltage across the capacitor C is equal to the operating voltage UA of the electronic harmonics filter 25.

A first desired value voltage UE is supplied to the controller 8, which desired value voltage is equal to the unsmoothed output voltage of the first rectifier 12. This first desired value voltage UE is compared in the controller 8 with a first actual value voltage UI, which is dropped across a resistance R3 and thus corresponds to the current flowing through the flyback converter 7. In known manner the controller 8 provides—as is set out in the literature references indicated above—that the current pulses taken from the first rectifier 12 have an envelope curve which is approximated to the sinusoidal half-wave pulses of the mains voltage.

Figure 2D:
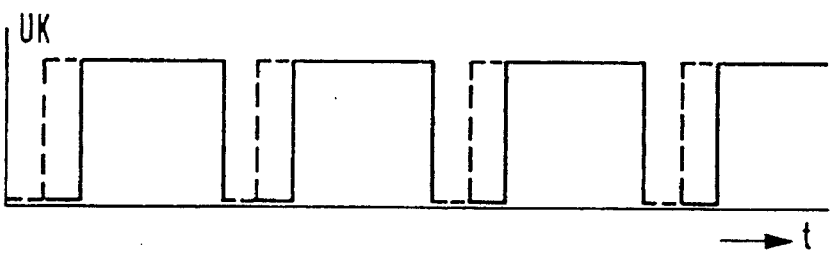
Figure 2E:
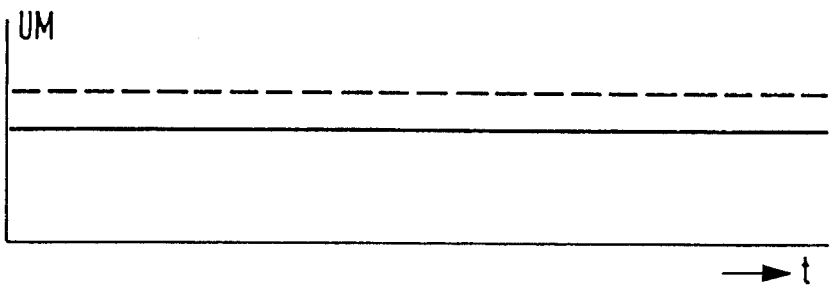

Further, a second desired value voltage UM is supplied to the controller 8, which desired value voltage is generated by a mean value generator 11. For this purpose the output voltage UK of a comparator 9 is supplied to the mean value generator 11, to one input of which comparator a voltage UR —taken from a voltage divider R1/R2—is supplied and the other input of which comparator is connected to a reference d.c. voltage source 10 which delivers a fixed d.c. voltage to the comparator 9. The voltage UR taken from the voltage divider R1/R2 is proportional to the unsmoothed output voltage UG of the second rectifier 4. The voltages UK and UM are illustrated in FIGS. 2d and 2e. From FIG. 2e one recognizes that the voltage UM is higher or lower in dependence upon the degree of dimming. The mean value generator 11 can be formed of a low-pass member working as an integrating member, for example by an RC member.

The controller 8 compares the second desired value voltage UM with the output voltage UA of the flyback converter 7 and from the control difference generates a control signal for the switch S the frequency f of which is correspondingly varied. In this way it is ensured that the output voltage UA is controlled to follows in dependence upon, the second desired value voltage UM. This means that by varying the degree of dimming at the dimmer 1 the brightness of the lamp 3 can be varied.

I claim:

1. An electronic ballast for supplying a load with an a.c. voltage whose frequency is higher than an a.c. mains frequency, said ballast comprising:

a first rectifier arranged to be connected to an a.c. mains;

an inverter connected downstream of said first rectifier, which inverter generates, at a frequency which is higher than the frequency of said a.c. mains, an a.c. voltage for the load; and an electronic harmonics filter which includes a clocked switching controller arranged between the first rectifier and the inverter, the output voltage of which harmonics filter is controlled;

characterised in that, a dimmer is arranged to be connected to said a.c. mains, said dimmer being connected to control the output voltage of said harmonics filter, whereby a desired value for the control of the output voltage of the harmonics filter is dependent upon voltage changes of said dimmer, said clocked switching controller being connected to be supplied with a first desired value signal, dependent upon the rectified mains voltage, and a first actual value signal dependent upon the rectified a.c. mains output form, said clocked switching controller also being connected such that the amplitudes of resulting output current pulses from said clocked switching controller are so controlled by comparison of said first desired value signal and said first actual value signal that the pulses form an envelope curve adapted to the sinusoidal half-waves of the rectified a.c. mains voltage.

2. An electronic ballast for supplying a load with an a.c. voltage whose frequency is higher than an a.c. mains frequency, said ballast comprising:

a first rectifier arranged to be connected to said a.c. mains;

an inverter connected downstream of said first rectifier, which inverter generates, at a frequency which is higher than the frequency of said a.c. mains, an a.c. voltage for the load; and an electronic harmonics filter which includes a clocked switching controller arranged between the first rectifier and the inverter, the output voltage of which harmonics filter is controlled;

characterised in that, a dimmer is arranged to be connected to the a.c. mains, said dimmer being connected to control the output voltage of said harmonics filter, whereby a desired value for the control of the output voltage of the harmonics filter is dependent upon voltage changes of said dimmer, said clocked switching controller being connected to be supplied with a second desired value signal dependent upon one of the input and output voltages of the dimmer and a second actual value signal, dependent upon an output voltage of the controller, said clocked switching controller including a switch which is switched at a frequency dependent upon a control difference of said second desired value signal and said second actual value signal.

3. An electronic ballast according to claim 2, characterized in that, an output voltage from of said dinner is supplied as the desired value signal to one input of a comparator, in that a threshold value voltage supply is connected to another input of the comparator, and in that the comparator is connected to supply its output voltage to a mean value generator, said mean value generator being constructed and arranged to generate said second desired value signal.

4. Electronic ballast according to claim 2, further comprising a second rectifier connected between said dimmer and said harmonics filter to alter the curve form of said a.c. mains voltage.

5. An electronic ballast according to claim 4, characterised in that, the dimmer includes a phase angle control circuit or a phase sector control circuit.

* * * * *